United States Patent
Shaffer

(10) Patent No.: US 6,464,433 B1
(45) Date of Patent: Oct. 15, 2002

(54) ELONGATE SUPPORT MEMBER AND METHOD OF MAKING THE SAME

(75) Inventor: William R. Shaffer, Greensburg, PA (US)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 09/209,128

(22) Filed: Dec. 10, 1998

(51) Int. Cl.⁷ .............................................. B23B 29/04
(52) U.S. Cl. ......................... 407/66; 407/118; 407/119
(58) Field of Search ........................... 407/66, 32, 118, 407/119; 408/143, 144, 145, 714; 75/248; 148/514, 668, 673; 419/28, 47

(56) References Cited

U.S. PATENT DOCUMENTS

| | | | |
|---|---|---|---|
| 2,055,769 A | * 9/1936 | Kinzel | 407/119 |
| 2,835,023 A | 5/1958 | Steeves | |
| 3,553,905 A | * 1/1971 | Lemelson | 407/119 X |
| 3,859,699 A | 1/1975 | Lindskog | 29/96 |
| 4,061,438 A | 12/1977 | New | 408/143 |
| 4,173,501 A | * 11/1979 | Hildebrandt et al. | 148/224 |
| 4,435,359 A | 3/1984 | Eiselstein et al. | 419/3 |
| 4,561,908 A | * 12/1985 | Berchem | 148/643 |
| 4,618,540 A | * 10/1986 | Von Holst et al. | 428/552 |
| 4,756,648 A | 7/1988 | Cusack | 408/156 |
| 4,762,559 A | * 8/1988 | Penrice et al. | 75/248 |
| 4,871,286 A | 10/1989 | Hunt | 408/144 |
| 4,909,677 A | * 3/1990 | Noguchi et al. | 407/66 |
| 4,960,563 A | * 10/1990 | Nicolas | 419/23 |
| 4,998,851 A | 3/1991 | Hunt | 408/143 |
| 5,098,233 A | 3/1992 | Patterson et al. | 407/101 |
| 5,125,774 A | 6/1992 | Catenacci | 408/232 |
| 5,186,739 A | * 2/1993 | Isobe et al. | 408/144 X |
| 5,235,879 A | * 8/1993 | Drougge | 407/119 X |
| 5,314,273 A | 5/1994 | Nakayama et al. | 408/233 |
| 5,336,026 A | 8/1994 | Noggle | 408/147 |
| 5,391,022 A | 2/1995 | Nakayama et al. | 408/233 |
| 5,599,144 A | * 2/1997 | Bickham et al. | 408/144 |
| 5,611,234 A | * 3/1997 | Allegrucci et al. | 72/377 |
| 5,649,714 A | * 7/1997 | Uchida et al. | 408/57 X |
| 5,716,170 A | * 2/1998 | Kammermeier et al. | 408/145 |
| 5,722,803 A | * 3/1998 | Battaglia et al. | 408/145 X |
| 5,993,571 A | * 11/1999 | Eto et al. | 148/320 |

FOREIGN PATENT DOCUMENTS

| | | | |
|---|---|---|---|
| EP | 0391881 | 10/1990 | |
| EP | 0508152 | 10/1992 | |
| JP | 7290305 | 11/1995 | |
| SU | 001779468 | * 12/1992 | 408/143 |

OTHER PUBLICATIONS

Baumeister et al., "Mark's Standard Handbook for Mechanical Engineers", McGraw–Hill Book Company, eighth edition, 1978, pp. 6–18, 6–23, 6–62, 6–78, and 6–105.*

International Search Report in PCT Patent Application No. PCT/US99/27361 (Mailed Mar. 3, 2000).

Johnson, W.A., Tungsten, Metals Handbook, Refractory Metals and Alloys, pp. 577–581.

Brochure entitled Teledyne Tungsten Products ISO 9002 (date unknown).

* cited by examiner

*Primary Examiner*—Henry Tsai
(74) *Attorney, Agent, or Firm*—John J. Prizzi

(57) ABSTRACT

An elongate support member such as a boring bar. The support member includes a body with an exterior surface and an exterior region adjacent to the exterior surface thereof. The body has an interior region remote from the exterior surface. The interior region is contiguous with the exterior region so as to define an interface therebetween. The interior region is of a first hardness, and a portion of the exterior region adjacent to the exterior surface is of a second hardness wherein the second hardness is greater than the first hardness.

19 Claims, 2 Drawing Sheets

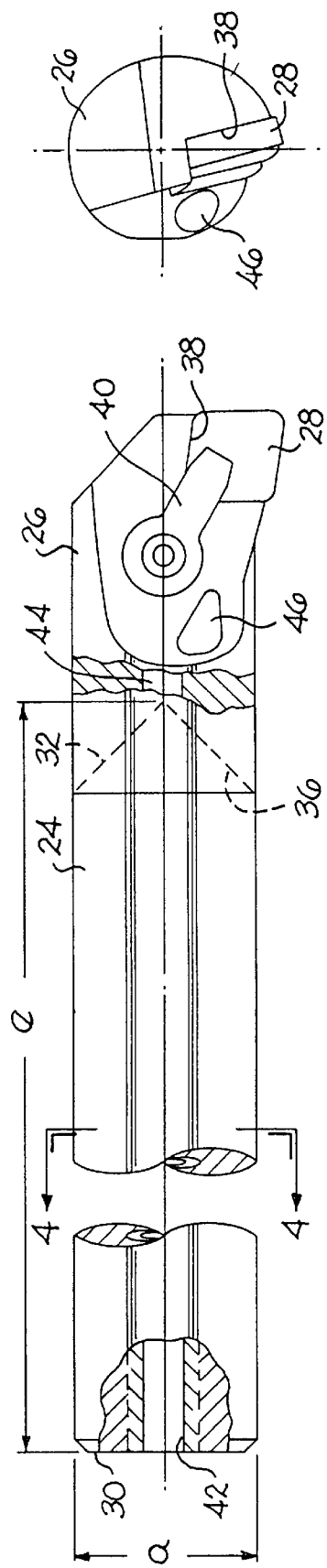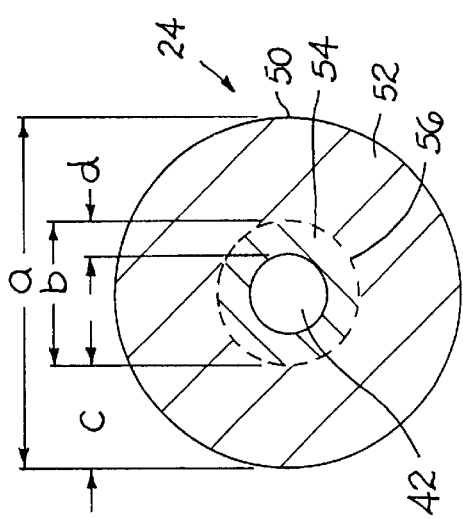

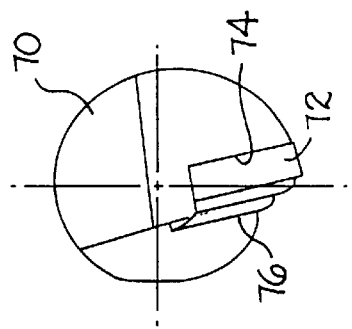
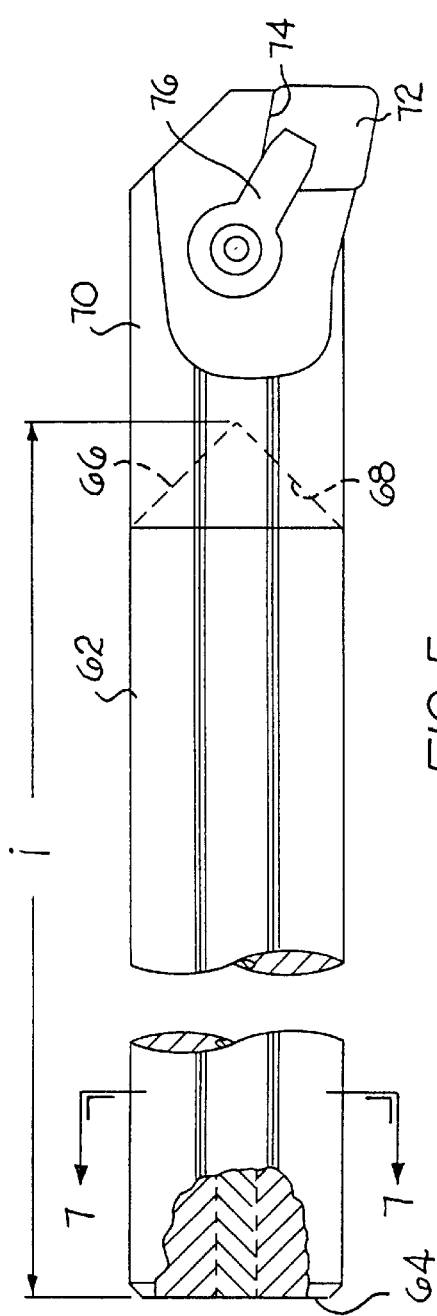
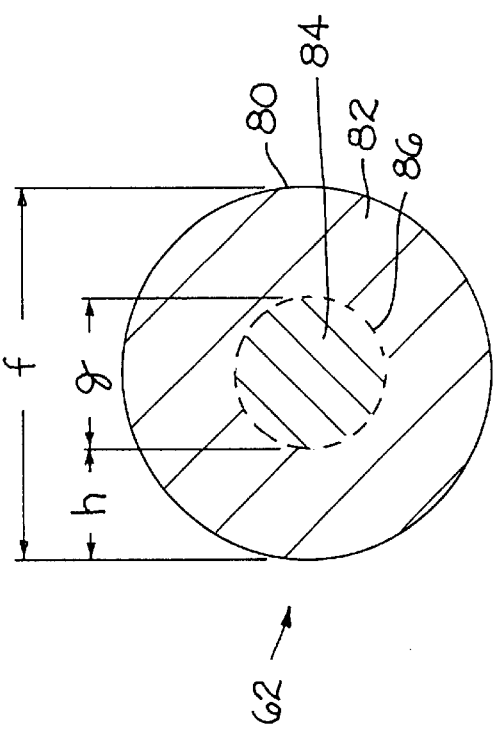

ELONGATE SUPPORT MEMBER AND METHOD OF MAKING THE SAME

BACKGROUND

In a process for removing material from a bore in a workpiece, the typical assembly to perform such a material removal process includes an elongate support member (e.g., an elongate boring bar) wherein one end of the boring bar connects to a cutting head which carries a cutting insert and the other end of the boring bar attaches to a support member. In order to accomplish the material removal operation, the cutting head extends into the bore of the workpiece so that the relative rotation between the cutting insert (held by the cutting head) and the workpiece enables the cutting insert to contact the surface which forms the bore, and hence, remove material (e.g., form a circumferential groove) from the surface of the bore.

Because of the fact that the boring bar has a cutting head at the one end thereof and the other end thereof attaches to a support member, the boring bar has a cantilever relationship with the support structure. Because of the nature of the cantilever relationship, the boring bar experiences certain stresses and strains during the material removal operation so that in order to provide adequate support to the cutting head and cutting insert held thereby, the boring bar should possess a relatively high modulus of elasticity and a relatively high degree of stiffness.

Heretofore, boring bars have been made from steel, hard metal (e.g., tungsten carbide), and tungsten alloys. While boring bars made of tungsten carbide have possessed a high modulus of elasticity and a sufficiently high stiffness, the brittleness of the tungsten carbide has resulted in these boring bars experiencing early failures. While the steel boring bars and the tungsten alloy boring bars may not possess the brittleness of the tungsten carbide, the stresses and strains which these boring bars experience can exceed the elastic limit of the material. The consequence of which is the permanent deformation of these boring bars which leads to a reduction in the useful life thereof.

It is apparent that there exists a need to provide a boring bar which possesses sufficient rigidity and resistance to plastic deformation so as to not deform under working conditions, and yet, is not so brittle as to fail in a premature fashion.

In the manufacture of tungsten carbide boring bars, as well as in the manufacture of tungsten alloy boring bars, sintering is the typical process by which the material is consolidated to form the boring bar. It can sometimes occur that as a result of the sintering process, the boring bar experiences warpage (or curving). This is an undesirable result since the extent of warpage may so great as to cause the boring bar to be unfit for use. While the warpage may not be so great as to cause the boring bar to be scrapped, the absence of optimum straightness in the boring bar may reduce the useful life of the boring bar and may also negatively impact upon the quality of the material removal operation.

It is apparent that it would be beneficial to provide a boring bar made via a sintering process wherein the finished boring bar would possess an optimum degree of straightness. By providing a boring bar with an optimum degree of straightness, the number of boring bars that would have to be scrapped would be diminished and the number of boring bar that would have a shortened useful life or would not provide for the optimum removal of material would be reduced.

In some circumstances, the boring bar must exhibit a certain degree of smoothness so as to not exceed a certain degree of surface roughness. It is not unusual that a sintered boring bar may undergo a post-sinter material removal treatment so as to create a surface with the requisite smoothness. It would be desirable to provide a process for making a sintered boring bar wherein the as-sintered boring bar has the requisite surface roughness, and hence, does not have to undergo a post-sinter material removal treatment.

SUMMARY

In one form thereof, the invention is an elongate support member which comprises a body which has an exterior surface, an exterior region adjacent to the exterior surface thereof and an interior region remote from the exterior surface. The interior region is contiguous with the exterior region so as to define an interface therebetween. The interior region is of a first hardness. A portion of the exterior region adjacent to the exterior surface is of a second hardness. The second hardness is greater than the first hardness.

In another form thereof, the invention is a process for making an elongate support member comprising the steps of: providing an elongate body with a transverse dimension and a longitudinal dimension, and the body has a pre-swaged exterior surface and a pre-swaged interior region; swaging the body so as to reduce the transverse dimension of the body and increase the longitudinal dimension of the body so to form a post-swaged exterior surface, an exterior region, and a post-swaged interior region wherein the exterior region is mediate of a post-swaged exterior surface and the post-swaged interior region; the post-swaged interior region being of a first hardness; a portion of the exterior region adjacent to the post-swaged exterior surface being of a second hardness; and the second hardness being greater than the first hardness.

In still another form thereof, the invention is a cutting assembly that comprises a cutting insert, and a cutting head carrying the cutting insert. The assembly further includes a support holder, and an elongate support member wherein the support member has opposite ends wherein one of the ends attaches to the cutting head and the other end connects to the support holder. The support member has an exterior surface, an exterior region adjacent to the exterior surface thereof, and an interior region remote from the exterior surface. The interior region is contiguous with the exterior region so as to define an interface therebetween. The interior region is of a first hardness. A portion of the exterior region adjacent to the exterior surface is of a second hardness. The second hardness is greater than the first hardness.

BRIEF DESCRIPTION OF THE DRAWINGS

The following is a brief description of the drawings which form a part of this patent application:

FIG. 1 is a top view of an assembly to remove material from a bore in a workpiece wherein the assembly includes a boring bar, a support, and a cutting head which carries a cutting insert;

FIG. 2 is a top view of the boring bar with the cutting head attached thereto wherein a portion of the boring bar is removed to show the central passage therein and a portion of the cutting head is removed to show a passage therein;

FIG. 3 is an end view of the boring bar of FIG. 2;

FIG. 4 is a cross-sectional view of the boring bar of FIG. 2 taken along section line 4—4 of FIG. 2 showing the microstructure of the boring bar in a schematic fashion where there is an interior region and an exterior region;

FIG. 5 is a top view of the boring bar with the cutting head attached thereto wherein a portion of the boring bar is removed to show the solid construction of the boring bar;

FIG. 6 is an end view of the boring bar of FIG. 5; and

FIG. 7 is a cross-sectional view of the boring bar of FIG. 5 taken along section line 7—7 of FIG. 5 showing the microstructure of the boring bar in a schematic fashion where there is an interior region and an exterior region.

DETAILED DESCRIPTION

Referring to the drawings, FIG. 1 illustrates an overall assembly (generally designated as 20) for the removal of material from the bore of a workpiece. Assembly 20 includes a support 22, an elongate boring bar (or elongate support member) 24, and a cutting head 26 which carries a cutting insert 28. The support 22 typically contains a bore (not illustrated) which receives a portion of the boring bar adjacent to and including the one end 30 (see FIG. 2) thereof so as to securely hold the boring bar 24 during the material removal operation.

The cutting head 26 is attached to the other end 32 of the boring bar 24 by brazing or the like. The other end 32 of the boring bar 24 is of a generally conical shape which is received in a complimentary shaped (i.e., generally conically shaped) recess 36 in the cutting head 26. The cutting head 26 is typically made from steel. The cutting head 26 presents a structure so that it can releasably retain a cutting insert 28 thereto. In the specific embodiment illustrated in FIGS. 1 and 2, the cutting insert 28 is retained in a pocket 38 in the cutting head 26 via a clamp 40. It should be appreciated that a variety of structures can be used to releasably retain the cutting insert 28 to the cutting head 26. The cutting insert 28 is typically made from any one of a wide variety of hard materials (coated and uncoated) suitable for use as a cutting insert such as, for example, cemented carbides, ceramics, cermets, and polycrystalline diamond composites.

The boring bar 24 contains an elongate central passage 42 which registers with a passage 44 in the cutting head 26. The central passage 42 in the boring bar 24 and the passage 44 in the cutting head 26 together provide for communication between a source of fluid (not illustrated) and the cutting insert 28 during a material removal operation. Coolant or other fluid exits the passage 44 through an outlet 46 adjacent to the cutting insert 28 so as to impinge upon the cutting insert 28.

The boring bar comprises a sintered tungsten-based alloy wherein it is preferable that the alloy comprises over about eighty weight percent tungsten with the balance comprising one or both of iron and nickel. More preferably, the alloy comprises between about 89 weight percent and about 98 weight percent tungsten, between about 1 weight percent and about 5.5 weight percent iron, and between about 1 weight percent and about 7.5 weight percent nickel. It is contemplated that other ranges and values within this broader range(s) may also prove to be beneficial and are considered to within the scope of the invention.

Referring to more specific compositions, appropriate tungsten-iron-nickel compositions comprise those set forth in Table I below.

TABLE I

Compositions for Tungsten-Iron-Nickel Alloys

| Composition No. | tungsten (weight percent) | nickel (weight percent) | iron (weight percent) |
|---|---|---|---|
| 1 | 89–91 | 5–7.5 | 3–5.5 |
| 2 | 91–94 | 4.8–7.2 | 1.2–1.8 |
| 3 | 94–96 | 2.8–4.2 | 1.2–1.8 |
| 4 | 96–98 | 1–2 | 1–2 |

Referring to FIG. 4, there is a cross-sectional view showing the expected microstructure of the boring bar 24 in a schematic fashion. In this regard, the boring bar 24 has an exterior surface 50, as well as an expected microstructure with an exterior region 52 adjacent to the exterior surface 50 thereof. The exterior region 52 presents a generally heterogeneous microstructure as will be described in more detail hereinafter. The boring bar 24 further has an interior region 54 remote from the exterior surface 50. The interior region 54 presents a generally homogeneous microstructure as will be described in more detail hereinafter. Furthermore, the interior region 54 is contiguous with the exterior region 52 so as to define an interface 56 therebetween.

The boring bar 24 has an axial length of "e" (see FIG. 2). Referring to FIG. 4, the boring bar 24 has a diameter (i.e., transverse dimension) "a". The interior region 54 has a diameter (i.e., transverse dimension) "b" wherein the passage 42 essentially separates the interior region 54 into two portions along the diameter thereof. Each portion of the interior region has a transverse dimension "d". Although the relationship may vary, the transverse dimension "b" of the interior region would be expected to typically range between about thirty-five percent and about forty-five percent of the transverse dimension "a" of the boring bar wherein the preferred percentage would be expected to equal about forty percent of the transverse dimension "a".

The interior region 54 essentially separates the exterior region 52 into two separate portions along the diameter of the boring bar. Since the cross-section of the interior region 54 and the exterior region 52 are generally circular, the transverse dimension "c" of the portion of the exterior region 52 between the interior region 54 and the exterior surface 50 is generally constant. The transverse dimension "d" is generally constant due to the generally circular cross-section of the interior region 54.

The interior region 54 would be expected to have a first hardness which would be in the range of between about 30 Rockwell C ($R_C$) and about 36 $R_C$ for a tungsten alloy comprising between about 89 weight percent and about 98 weight percent tungsten, between about 1 weight percent and about 5.5 weight percent iron, and between about 1 weight percent and about 7.5 weight percent nickel. It is contemplated that ranges and values within this broader range may prove beneficial and are contemplated to be within the scope of the invention.

A portion of the exterior region 52 adjacent to the exterior surface 50 would be expected to have a second hardness which would be in the range of between about 40 $R_C$ and about 48 $R_C$ for a tungsten alloy comprising between about 89 weight percent and about 98 weight percent tungsten, between about 1 weight percent and about 5.5 weight percent iron, and between about 1 weight percent and about 7.5 weight percent nickel. It is contemplated that ranges and values within the broader range may prove beneficial and are contemplated to be within the scope of the invention.

More specific hardnesses that would be expected for the interior region and the exterior region for the Compositions Nos. 1 in Table I are set forth in Table II below.

TABLE II

Expected Hardness of Interior Region and Exterior Region

| Composition No. | Expected Hardness ($R_c$) Interior Region [First Hardness] | Expected Hardness ($R_c$) Exterior Region [Second Hardness] |
| --- | --- | --- |
| 1 | 30–36 | 40–48 |
| 2 | 33 | 43–44 |
| 3 | 34 | 44–45 |
| 4 | 35 | 46–47 |

As becomes apparent, the second hardness would be expected to be greater than the first hardness. Furthermore, it should be appreciated that there is the expectation that the microstructure of the exterior region 52 would vary across the transverse dimension "c" of the exterior region 52 such that the hardness of the exterior region 52 would increase from the exterior region-interior region interface 56 to the portion of the exterior region 52 adjacent to the exterior surface 50.

Referring to FIGS. 5 through 7, there is illustrated a second specific embodiment of a solid boring bar 62. Boring bar 62 has opposite ends 64 and 66. A cutting head 70 is attached to the other end 66 of the boring bar 62 by brazing or the like. The other end 66 of the boring bar 62 is of a generally conical shape which is received in a complimentary shaped recess 68 in the cutting head 70.

The cutting head 70 is typically made from steel. The cutting head 70 presents a structure so that it can releasably retain a cutting insert 72. In the specific embodiment, the cutting insert 72 is retained in a pocket 74 in the cutting head 70 via a clamp 76. Like for the first specific embodiment, it should be appreciated that a variety of structures can be used to releasably retain the cutting insert to the cutting head. It should also be appreciated that like for the first specific embodiment, the cutting insert 72 is typically made from one of a wide variety of hard materials (coated and uncoated) such as, for example, cemented carbides, ceramics, cermets, and polycrystalline diamond composites.

Referring to FIG. 7, there is a cross-sectional view showing the expected microstructure of the solid boring bar 62 in a schematic fashion. In this regard, the boring bar 62 has an exterior surface 80, as well as an expected microstructure with an exterior region 82 adjacent to the exterior surface 80 thereof. The boring bar 62 further has an interior region 84 remote from the exterior surface 80. The interior region 84 is contiguous with the exterior region 80 so as to define an interface 86 therebetween.

The boring bar 62 has an axial length of "i" (see FIG. 5). Referring to FIG. 7, the boring bar 62 has a diameter (i.e., transverse dimension) "f". The interior region 84 has a diameter (i.e., transverse dimension) "g". Although the relationship may vary, the transverse dimension "g" of the interior region would be expected to range between about 35 percent and about 45 percent of the transverse dimension "f" of the boring bar wherein the preferred percentage equals about 40 percent of the transverse dimension "f".

The interior region 84 essentially separates the exterior region 82 into two separate portions along the diameter of the boring bar. Since the cross-section of the interior region 84 and the exterior region 86 are generally circular, the transverse dimension "h" of the portion of the exterior region 86 between the interior region 84 and the exterior surface 80 is generally constant.

The interior region 84 would be expected to have a first hardness which would be in the range of between about 30 $R_C$ and about 36 $R_C$ for a tungsten alloy comprising between about 89 weight percent and about 98 weight percent tungsten, between about 1 weight percent and about 5.5 weight percent iron, and between about 1 weight percent and about 7.5 weight percent nickel. It is contemplated that ranges and values within the broader range(s) may prove beneficial and such are contemplated to be within the scope of the invention.

A portion of the exterior region 82 adjacent to the exterior surface 84 would be expected to have a second hardness which is in the range of between about 40 $R_C$ and about 48 $R_C$ for a tungsten alloy comprising between about 89 weight percent and about 98 weight percent tungsten, between about 1 weight percent and about 5.5 weight percent iron, and between about 1 weight percent and about 7.5 weight percent nickel. It is contemplated that ranges and values within the broader range(s) may prove beneficial and such are contemplated to be within the scope of the invention.

The exterior region 82 would be expected to have a heterogeneous microstructure wherein the microstructure of the exterior region 82 would be expected to vary across the transverse dimension "h" of the exterior region 82 such that there is the expectation that the hardness of the exterior region 82 would increase from the exterior surface-interior surface interface 86 to the portion of the exterior region 82 adjacent to the exterior surface 80. The interior region 84 would be expected to have a generally homogeneous microstructure.

The boring bar (24 and 62) must be of a sufficient transverse dimension (e.g., diameter) so that the result of the swaging step is a two stage microstructure comprising an exterior region and an interior region. If the transverse dimension of the boring bar is not great enough, then the swaging will produce a microstructure that is essentially homogeneous across the transverse dimension thereof.

In this regard, one actual example comprised a boring bar of a diameter of about 0.825 inches (20.9 millimeters [mm]) that was swaged so as to reduce the diameter from $^{11}/_{16}$th inches (17.5 mm). The boring bar exhibited a microstructure that was essentially homogeneous across the transverse dimension (i.e., diameter) thereof. Five hardness measurements were taken at 4 mm intervals beginning at a point radially inward a distance of 2 mm from the exterior surface. These measurements are as follows: 73.4, 73.7, 73.3, 73.7, and 73.3 Rockwell A. This actual sample reveals that the diameter of the boring bar prior to swaging (i.e., the pre-swaged bar stock) must be large enough so as to result in a two stage microstructure as opposed to being of such a small diameter so as to produce a homogeneous microstructure.

Referring to the process for making the boring bar (26, 62), the basic process comprises the steps of: (a) mixing powder components to form a powder mixture; (b) compacting the powder mixture to form a partially dense compact; (c) consolidating the partially dense compact under one or both of heat and pressure so as to form the elongate body; and (d) swaging the elongate body to form the finished boring bar.

In regard to the mixing step, the powder components are typically placed within a ball mill (or a like device) and ball milled for a predetermined time to achieve a particle size within a desired range.

In regard to the compacting step, the powder mixture is placed within a mold and pressure (either alone or in combination with heat) is exerted on the powder mixture so as to form the powder mixture into a partially dense compact (or so-called "green" compact) of a predetermined shape.

In regard to the consolidation step, a typical process is liquid phase sintering either under pressure or without pressure. The sintering process consolidates the partially dense compact to an as-sintered body of full density, i.e., usually at least about 99 percent of the theoretical density. The as-sintered (or consolidated) body has a transverse dimension and a longitudinal dimension. The consolidated body has a pre-swaged exterior surface and a pre-swaged interior region which essentially spans the entire transverse dimension of the body. The microstructure of the pre-swaged interior region is essentially homogeneous.

In regard to the swaging step, the consequence of the swaging is to reduce the transverse dimension of the body and to increase the longitudinal dimension of the body. However, the transverse dimension of the body and/or the extent of the transverse reduction must not be such so as to create an essentially homogeneous microstructure across the transverse dimension of the post-swaged boring bar. Instead, the swaging step must produce (and it is expected to produce) a post-swaged body that has a post-swaged exterior surface, an exterior region, and a post-swaged interior region wherein the exterior region is mediate of a post-swaged exterior surface and the post-swaged interior region.

The post-swaged interior region is of a first hardness. A portion of the exterior region adjacent to the post-swaged exterior surface is of a second hardness wherein the second hardness is greater than the first hardness.

It should be appreciated that it is expected that the post-swaged exterior surface has a surface roughness less than the surface roughness of the exterior surface of the pre-swaged bar stock. It should be further appreciated that the swaging step would be expected to reduce the transverse dimension of the body between about 15 percent and about 25 percent, and increases the longitudinal dimension of the body between about 15 percent and about 25 percent. It is contemplated that ranges and values within these broader range(s) may prove beneficial and are contemplated to be within the scope of the invention.

The above description focuses on a boring bar as the elongate support member wherein the boring bar is stationary while the workpiece rotates. It should, however, be appreciated that the present invention has application to more elongate support members than only a boring bar. In this regard, a support bar which holds a button cutter wherein the cutter and the support bar rotate while the workpiece remains stationary is contemplated to be within the scope of the instant invention.

The patents and other documents identified herein are hereby incorporated by reference herein.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. An elongate support member comprising:
    a body having an exterior surface;
    the body having an exterior region adjacent to the exterior surface thereof;
    the body having an interior region remote from the exterior surface;
    the exterior region having essentially the same composition as the interior region;
    the interior region being contiguous with the exterior region so as to define an exterior region-interior region interface thereat;
    the interior region being of a first hardness;
    a portion of the exterior region adjacent to the exterior surface being of a second hardness;
    the second hardness being greater than the first hardness; and
    wherein the body is a sintered tungsten-based alloy.

2. The elongate support member of claim 1 wherein the hardness of the exterior region increases from the exterior region-interior region interface to the portion of the exterior region adjacent to the exterior surface.

3. The elongate support member of claim 2 wherein the hardness of the exterior region between the exterior region-interior region interface to the portion of the exterior region adjacent to the exterior surface changes at a constant rate.

4. The elongate support member of claim 1 wherein the interior region having a generally homogeneous microstructure.

5. The elongate support member of claim 1 wherein the exterior region having a heterogeneous microstructure wherein the microstructure of the exterior region varies across the dimension of the exterior region such that the hardness of the exterior region increases from the exterior region-interior region interface to the portion of the exterior region adjacent to the exterior surface.

6. The elongate support member of claim 1 wherein over about eighty weight percent of the tungsten alloy comprises tungsten, and the tungsten alloy further includes one or both of iron and nickel.

7. The elongate support member of claim 6 wherein the tungsten alloy comprises between about 89 weight percent and about 98 weight percent tungsten, between about 1 weight percent and about 5.5 weight percent iron, and between about 1 weight percent and about 7.5 weight percent nickel.

8. The elongate support member of claim 7 wherein the first hardness is equal to between about about 30 Rockwell C and 36 Rockwell C.

9. The elongate support member of claim 8 wherein the second hardness ranges between about 40 Rockwell C and about 48 Rockwell C.

10. The elongate support member of claim 1 wherein the body having opposite ends, and the body containing a passage therethrough placing the opposite ends thereof in communication.

11. The elongate support member of claim 1 wherein the body having a transverse dimension, the portion of the transverse dimension being within the interior region ranging between about 35 percent and about 45 percent of the transverse dimension of the body.

12. A cutting assembly comprising:
    a cutting insert;
    a discrete cutting head, the cutting head carrying the cutting insert;
    a discrete support holder;
    an elongate support member, the support member having opposite ends wherein one of the ends attaches to the cutting head and the other end connects to the support holder;
    the support member having an exterior surface;
    the support member having an exterior region adjacent to the exterior surface thereof;

the support member having an interior region remote from the exterior surface;

the exterior region having essentially the same composition as the interior region;

the interior region being contiguous with the exterior region so as to define an exterior region-interior region interface thereat;

the interior region being of a first hardness;

a portion of the exterior region adjacent to the exterior surface being of a second hardness; and the second hardness being greater than the first hardness.

13. The cutting assembly of claim 12 wherein the hardness of the exterior region of the support increases from the exterior region-interior region interface to the portion of the exterior region adjacent to the exterior surface.

14. The cutting assembly of claim 13 wherein the hardness of the exterior region between the exterior region-interior region interface to the portion of the exterior region adjacent to the exterior surface changes at a constant rate.

15. The cutting assembly of claim 12 wherein the interior region having a generally homogeneous microstructure.

16. The cutting assembly of claim 12 wherein the exterior region having a heterogeneous microstructure wherein the microstructure of the exterior region varies across the dimension of the exterior region such that the hardness of the exterior region increases from the exterior region-interior region interface to the portion of the exterior region adjacent to the exterior surface.

17. An elongate boring bar comprising:

a body having opposite ends wherein one of the ends including a pocket to receive a discrete cutting head;

the body having an exterior surface;

the body having an exterior region adjacent to the exterior surface thereof;

the body having an interior region, the interior region being separated from the exterior surface by the exterior region;

the exterior region having essentially the same composition as the interior region;

the interior region being contiguous with the exterior region so as to define an exterior region-interior region interface thereat;

the interior region being of a first hardness;

a portion of the exterior region adjacent to the exterior surface being of a second hardness; and the second hardness being greater than the first hardness.

18. The boring bar of claim 17 wherein the hardness of the exterior region increases from the exterior region-interior region interface to the portion of the exterior region adjacent to the exterior surface.

19. The boring bar of claim 17 wherein the interior region having a generally homogeneous microstructure, and the exterior region having a heterogeneous microstructure wherein the microstructure of the exterior region varies across the dimension of the exterior region such that the hardness of the exterior region increases from the exterior surface-interior surface interface to the portion of the exterior region adjacent to the exterior surface.

\* \* \* \* \*